Oct. 6, 1959  A. L. CASAS  2,907,237
UNLOCKING DEVICE FOR AUTOMOBILES
Filed March 11, 1957

ANTHONY L. CASAS,
INVENTOR.
BY

United States Patent Office 2,907,237
Patented Oct. 6, 1959

2,907,237

UNLOCKING DEVICE FOR AUTOMOBILES

Antonio L. Casas, Los Angeles, Calif.

Application March 11, 1957, Serial No. 645,212

3 Claims. (Cl. 81—3)

My present invention relates to devices for entering locked automobiles without the use of a key, and it relates particularly to a simple but effective device for entering a locked automobile without a key and which can be quickly and easily inserted through the soft rubber cushioning around the wind wing of an automobile, and then operatively engaged with the locking button on the door of the automobile to unlock the door without doing any damage whatsoever to the automobile.

Although various means have heretofore been devised for gaining entry to locked automobiles without the use of a key, these prior art devices were usually difficult to operate, requiring a great deal of practice and skill for their successful operation. Also, some prior art devices designed to gain entry to automobiles without the use of a key were likely to cause substantial damage to the automobile.

In view of these and other problems in this art, it is an object of my present invention to provide an unlocking device for automobiles which is adapted to operatively engage the locking button on a door of the automobile, raising the locking button to unlock the door, without forcing any members, and without requiring any substantial skill for the operation of the device.

Another object of my present invention is to provide an unlocking device for automobiles which can be readily inserted through the soft rubber cushioning around the wind wing of an automobile and subsequently operatively engaged to the locking button on a door of the automobile, and which can then, by a simple manipulation, lift the locking button to unlock the door.

A further object of my present invention is to provide an unlocking device for automobiles of the character described which is simple in construction, positive in operation, sturdy, and which requires no substantial skill for its operation.

Other objects and advantages of my present invention will be apparent from the following description and claims, the novelty of my invention consisting in the features of construction, combinations of parts, the novel relations of the members and the relative proportioning, disposition and operation thereof, all as is more completely described herein and as is more particularly pointed out in the appended claims.

In the drawings, forming a part of my present specification, Figure 1 is a perspective view illustrating the operation of my invention in unlocking an automobile.

Figure 1:
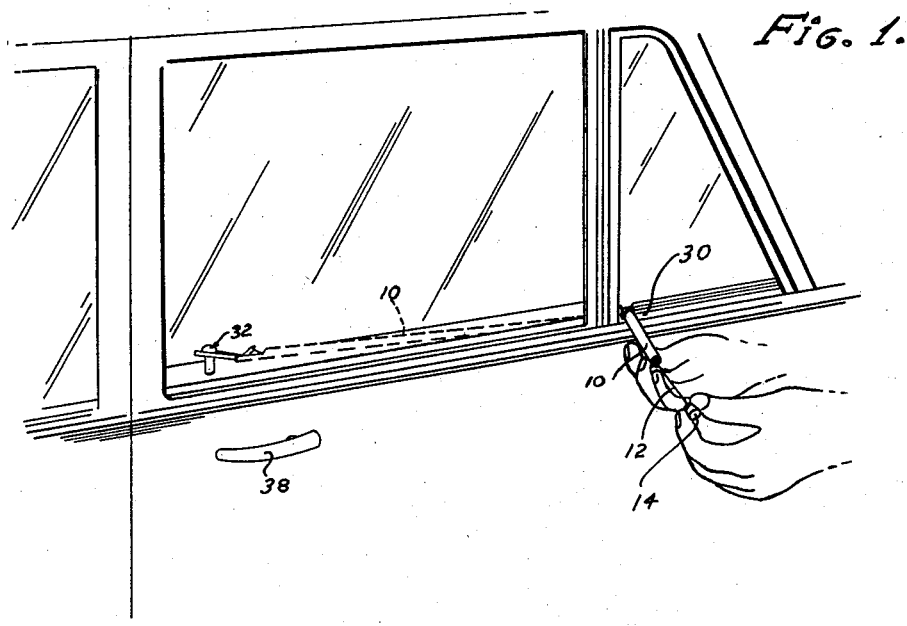

Referring to my drawings, I provide a long, thin metal tube 10, which is sufficiently thin to pass readily through the gap provided by spreading the soft rubber cushioning around a wind wing of an automobile part. A presently preferred metal tube 10 has an inner diameter of about $\frac{1}{16}$ of an inch, with an outer diameter of about $\frac{1}{8}$ of an inch, although other sizes can obviously be employed within the present invention.

Slidably mounted through the long, thin metal tube 10 is a somewhat flexible wire member 12, which preferably consists of a spring type of wire such as piano wire. A manipulating handle 14 is mounted on the outer or rear end of the wire 12, being integrally attached to the wire 12.

At the front, or operating end of tube 10, the tube 10 is provided with a longitudinal opening or slot 16, which permits the front end 18 of the wire 12 to be exposed.

Pivotally mounted on a pivot pin 20 at the forward end of the slotted portion of tube 10 is a forked lever member 22 which has an upwardly directed angle bend at the pivot point. A fork 24 is provided at the forward end of the forked lever member 22, this fork 24 preferably having a V-shape to permit operative engagement of the fork 24 with a locking button of any dimensions. A rearwardly extending lever arm 26 is provided at the rear end of forked lever member 22, and the front end 18 of wire 12 is affixed to the rear end of the rearwardly extending lever arm 26.

Having described the structural details of my present invention, I will now describe the operation of my invention.

First, the metal tube is bent to a desired shape to permit operative engagement of the forked lever member 22 with the locking button on the door of an automobile. Then, in the manner shown in Figure 1 of the drawings, the forked lever member 22 and the long, thin metal tube 10 are passed through a gap provided by spreading the soft rubber cushioning 30 that is disposed below a wind wing 28 of an automobile. In feeding my device through this gap in the soft rubber cushioning 30 below the wind wing 28, after the fork portion 24 of the lever member 22 passes through the gap, the rearwardly extending lever arm 26 of lever member 22 may be flattened down against the slotted portion of tube 10 so that the thickness presented at that point will only be substantially the thickness of tube 10.

When the tube 10 and its forward operating end have thus been passed through the space in the frame around the wind wing 28, the wire 12 is moved forwardly through metal tube 10 until the fork portion 24 of lever member 22 is generally in alignment with the forward end of metal tube 10. The fork 24 is then slid into operative engagement with the locking button 32 of a door of a car, with the shank portion 34 of locking button 32 being engaged between the bifurcations of fork 24 in the manner shown in Figures 2 and 3 of the drawings.

Figure 2:
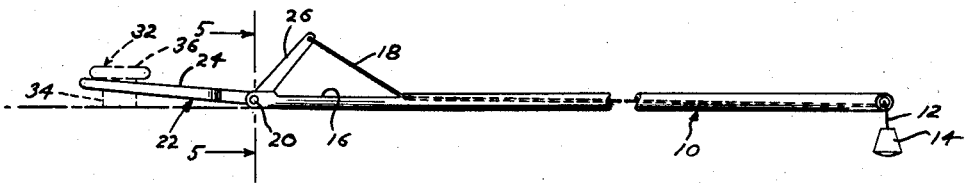
Figure 2 is a side elevational view of my device showing my forked lever member in its lowered position for operatively engaging the locking button on the door of an automobile when the locking button is in its lowermost or locked position.
Figure 3:
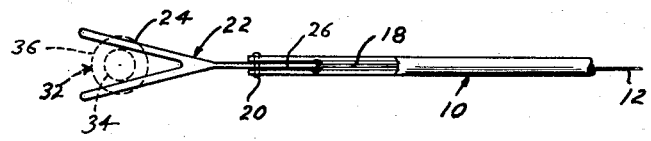
Figure 3 is a fractional plan view of my device in the same operative position of the device as in Figure 2.
Figure 5:
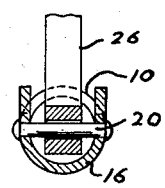
Figure 5 is a vertical section along the line 5—5 in Figure 2 showing the details of my pivotal mounting of my forked lever member on the forward end of my metal tube.
Figure 4:
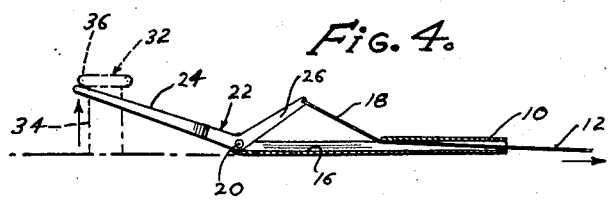
Figure 4 is a fractional side elevational view of my device with the forked lever member of my device in its raised position operatively engaged with the locking button on the door of an automobile, illustrating the manner in which the locking button is raised by my device to unlock the automobile.

The wire 12 is then pulled rearwardly through tube 10, thus pulling the rearwardly extending lever arm 26 of lever member 22 rearwardly, causing lever member 22 to pivot clockwise in Figures 2 and 4 of the drawings.

This causes the fork 24 at the forward end of lever member 22 to operatively engage the head portion 36 of locking button 32, thus raising and unlocking the locking button 32, so that the door of the automobile can be opened by merely actuating the door handle 38 on the car door.

If the wire member 12 has a substantial amount of rigidity, such as is found in piano wire, then slidable movement of wire 12 through metal tube 10 will cause corresponding rotation of lever member 22, regardless of whether the wire 12 is pushed forwardly through tube 10 or pulled rearwardly through tube 10. However, if a highly flexible and limber wire member 12 is provided, forward movement of the wire member may not apply much rotational force to the lever member 22. However, the weight of the fork portion 24 of lever member 22 will normally be sufficient to cause anti-clockwise rotation of lever member 22 to the position shown in Figure 2, and if it is desired, a supplemental spring (not shown) may be provided between lever member 22 and metal tube 10 to cause anti-clockwise rotation of lever member 22.

It will be obvious from the foregoing that my invention is simple and inexpensive to manufacture, and that it may be easily operated by anyone, regardless of the amount of practice or skill which that person may have.

There is no likelihood of damage to the automobile when my device is properly employed, and there is no forcing of any member of the automobile.

My device is particularly adapted for use by garage and parking-lot personnel, by locksmiths, police, and the like.

I have found in practice that my present invention will operate satisfactorily on most makes of automobiles.

It is to be understood that the form of my invention herein shown and described is my preferred embodiment and that various changes in the shape, size and arrangement of parts may be resorted to without departing from the spirit of my invention, or the scope of the appended claims.

I claim:

1. An unlocking device for automobiles which is adopted to be inserted through the window molding in the door of an automobile and operatively engaged with the locking button on a door of the automobile, including a long, thin tube, a forked member pivotally mounted on the front end of said tube, with the forked portion thereof being operatively engageable with said unlocking button, and a flexible shaft slidably mounted through said tube with one end thereof attached to said forked member at a point spaced from said pivot and the other end thereof extending out of the rear end of said tube, whereby manipulation of the exposed rear portion of said flexible shaft to slide said flexible shaft relative to said tube will rotate said forked member about said pivot to cause said forked member to lift said unlocking button.

2. An unlocking device for automobiles which is adapted to be inserted through the window molding in the door of an automobile and operatively engaged with the locking button on a door of the automobile, including a long, thin tube, a lever member pivotally mounted on the front end of said tube, said lever member having a fork portion extending forwardly from the pivot for operative engagement with said unlocking button and a lever arm extending upwardly from the pivot, and a flexible shaft slidably mounted through said tube with one end thereof attached to said lever arm at a point spaced upwardly from said pivot and the other end thereof extending out of the rear end of said tube, whereby manipulation of the exposed rear portion of said flexible shaft to slide said flexible shaft rearwardly relative to said tube will rotate said lever member about said pivot to cause said fork portion of said lever member to lift said unlocking button.

3. An unlocking device for automobiles which is adapted to be inserted through the window molding in the door of an automobile and operatively engaged with the locking button on a door of the automobile, including a long, thin tube, the forward end of which is slotted to provide a channel, a lever member pivotaly mounted in said channel portion of said tube, said lever member having a fork portion extending forwardly from the pivot for operative engagement with said unlocking button and a lever arm extending upwardly from said pivot, and a flexible shaft slidably mounted through said tube with one end thereof attached to said lever arm at a point spaced upwardly from said pivot and the other end thereof extending out of the rear end of said tube, whereby manipulation of the exposed rear portion of said flexible shaft to slide said flexible shaft rearwardly relative to said tube will rotate said lever member about said pivot to cause said forked portion of said lever member to lift said unlocking button.

References Cited in the file of this patent

UNITED STATES PATENTS

| | | |
|---|---|---|
| 1,512,913 | Dugan | Oct. 28, 1924 |
| 2,344,696 | Graham | Mar. 21, 1944 |
| 2,350,250 | Pietrobon | May 30, 1944 |

OTHER REFERENCES

Page 267, "The Manual of Locksmithing" (1941), by S. A. McLean of Denver, Colorado.